United States Patent [19]

Tomomatsu et al.

[11] Patent Number: 5,245,541
[45] Date of Patent: Sep. 14, 1993

[54] SYSTEM FOR AND METHOD OF CONTROLLING AUTOMATIC TRANSMISSION

[75] Inventors: Hideo Tomomatsu, Nagoya; Toshiyuki Asada, Toyota; Yasuo Hojo, Nagoya, all of Japan

[73] Assignee: Toyota Jidosha Kabushiki Kaisha, Toyota, Japan

[21] Appl. No.: 701,072

[22] Filed: May 16, 1991

[30] Foreign Application Priority Data

May 18, 1990 [JP]  Japan ................................ 2-128430

[51] Int. Cl.⁵ .......................... G06F 15/50; G06F 7/70; B60K 31/04; B60K 41/04
[52] U.S. Cl. ................................. 364/424.1; 74/866; 180/177
[58] Field of Search ........... 364/424.1, 426.06, 424.05; 180/179; 74/866, 867, 862, 865

[56] References Cited

U.S. PATENT DOCUMENTS

| | | | |
|---|---|---|---|
| 4,495,576 | 1/1985 | Ito | 364/424.1 |
| 4,584,906 | 4/1986 | Nagaoka et al. | |
| 4,638,690 | 1/1987 | Hattori et al. | 74/866 |
| 4,697,478 | 10/1987 | Mastumoto et al. | 180/179 |
| 4,809,175 | 2/1989 | Hosaka et al. | |
| 4,819,777 | 4/1989 | Yasue et al. | |
| 4,841,815 | 6/1989 | Takahashi | |
| 4,966,049 | 10/1990 | Takahashi | |
| 5,005,133 | 4/1991 | Takahashi | 364/426.04 |
| 5,046,383 | 9/1991 | Butts et al. | 74/862 |
| 5,089,963 | 2/1992 | Takahashi | 364/424.1 |
| 5,109,731 | 5/1992 | Iwatsuki et al. | 364/424.1 |
| 5,113,720 | 5/1992 | Asayama et al. | 74/866 |
| 5,119,695 | 6/1992 | Milunas et al. | 74/866 |
| 5,122,956 | 6/1992 | Satoh et al. | 364/424.1 |
| 5,128,868 | 7/1992 | Imai et al. | 364/424.1 |
| 5,133,229 | 7/1992 | Asada et al. | 364/424.1 |
| 5,182,710 | 1/1993 | Tomisawa | 364/424.1 |

FOREIGN PATENT DOCUMENTS

| | | | |
|---|---|---|---|
| 57-195951 | 12/1982 | Japan | 364/424.1 |
| 58-65353 | 4/1983 | Japan | |
| 2143914 | 2/1985 | United Kingdom | |

*Primary Examiner*—Thomas G. Black
*Assistant Examiner*—J. H. Louis-Jacques
*Attorney, Agent, or Firm*—Oblon, Spivak, McClelland, Maier & Neustadt

[57] ABSTRACT

A control system of an automatic transmission for determining and setting a gear stage on the basis of at least two of the parameters including a vehicle speed and a throttle opening. The control system comprises: a first detector for detecting a first parameter; a second detector for detecting a second parameter; a gear stage memory for determining and storing speed stage areas for holding the gear stages individually in terms of the first and second parameter and any two speed stage areas in a partially overlaid manner; a shift decider for determining a shift to be executed, on the basis of the first parameter outputted from the first detector, the second parameter outputted from the second detector, and the stored content of the gear stage memory; and a gear stage determiner for determining a gear stage to be set, if there are a plurality of gear stages determined by the first parameter and second parameter detected, at any of the gear stages.

18 Claims, 6 Drawing Sheets

SYSTEM FOR AND METHOD OF CONTROLLING AUTOMATIC TRANSMISSION

BACKGROUND OF THE INVENTION

The present invention relates to a technology for controlling the shifts of an automatic transmission in a vehicle such as an automobile.

Since an automotive engine has a low output torque at a low rotational speed, as is well known in the art, the gear stages to be set by the automatic transmission is determined in dependence upon the two parameters: an engine load and a vehicle speed so that the automobile may smoothly run on not only a flat road but also an uphill. FIG. 10 is a shift diagram disclosed in Japanese Patent Laid-Open No. 30558/1983. The abscissa plots the rotational speed of the output shaft dictating the vehicle speed, and the ordinate plots a degree of throttle opening dictating the engine load. Solid lines and broken lines indicate upshift lines and downshift lines, respectively. As will be seen from that those shift lines are upward to the right, the higher stage is set for the higher speed, and the lower state is set for the larger throttle opening with the deeper depression of the accelerator pedal. Here, the reason why hysteresis is established by shifting the downshift lines leftward with respect to the upshift lines is to prevent the upshifts or downshifts from being frequently caused with small fluctuations of the vehicle speed or the throttle opening.

In the shift controls according to the shift diagram of FIG. 10, therefore, if the running conditions such as the vehicle speed or the throttle opening change to others across an upshift line, a corresponding upshift is caused to a gear stage which is determined by the new running conditions (e.g., the vehicle speed or the throttle opening). If, on the contrary, the running conditions change to others across a downshift line, a corresponding downshift is caused to a gear stage which is determined by the new running conditions. As a result, each of the gear stages excepting the lowest and highest ones is held, while the running conditions are within an area defined by the upshift line and the downshift line. Moreover, the lowest gear stage is held while the running conditions are within an area having its upper limit defined by the upshift line, whereas the highest gear stage is held while the running conditions are within an area having its lower limit defined by the downshift line.

It seems from the aforementioned shift diagram that a plurality of gear stages could be set for a specific running condition by setting the hysteresis. As has been described hereinbefore, however, when a certain running condition varies to another exceeding the shift line, there is caused a shift to a gear stage determined by that shift line. The gear stage, which is set as the running condition changes over the shift line, is uniquely determined in dependence upon the vehicle speed and the throttle opening so that no room is left for selecting the gear stages. For an efficient run exploiting the engine performance sufficiently, moreover, the individual gear stages have to be sequentially set within a predetermined vehicle speed range.

Here, the shift chart of FIG. 10 exemplifies four forward stages including an overdrive stage. In case, however, more stages are required for improving the power performance, the shift lines come close to each other to make narrow the individual areas for the gear stages. If, therefore, the shift controls according to the conventional shift diagram were to be applied to an automatic transmission having more stages of shift control, even a relatively small change in the vehicle speed or the throttle opening would be one in the running conditions exceeding the shift lines so that the shifts might frequently occur to deteriorate the driving comfort and the durability.

In order to avoid the so-called "busy shift" causing the shifts frequently, it could be conceivable to effect the so-called "skip shift" to a gear stage farther of two stages. This case is followed by a problem that the gear stage set as a result of the skip shift is not always the optimum one.

SUMMARY OF THE INVENTION

An object of the present invention is to effect the shift controls which are enabled to improve the running performance of a vehicle by setting a gear stage optimum for the running conditions.

Another object of the present invention is to effect the shift controls not too frequently even if the automatic transmission is given multiple gear stages.

According to the present invention, there is provided a control system comprising: gear stage memory means for determining and storing in advance a plurality of speed stage areas for holding a plurality of gear stages individually, in terms of a first parameter and a second parameter and in a partially overlaid manner; shift decision means for deciding a shift to be executed on the basis of the first parameter and second parameter detected and the stored content of the shift stage memory means; and shift stage determining means for determining a gear stage to be set after the shift decided by the shift decision means, if there are a plurality of gear stages determined by the first parameter and second parameter detected, at any of the gear stages.

The gear stage determining means determines any of the gear stages on the basis of any of the changing rate of the throttle opening, the acceleration or deceleration of the vehicle, the gradient of a road, and the rotational speed of the engine.

According to the present invention, there is provided a control method comprising the steps of: determining a plurality of speed stage areas for holding a plurality of gear stages individually in terms of a first parameter and a second parameter and in a partially overlaid manner; deciding a shift to be executed on the basis of the first and second parameters detected and the speed stage areas stored; determining a gear stage to be set after the shift decided at said decision step, if there are a plurality of gear stages determined by the first parameter and second parameter detected, at any of the gear stages on the basis of a third parameter.

The above and further objects and novel features of the present invention will more fully appear from the following detailed description when the same is read in connection with the accompanying drawings. It is to be expressly understood, however, that the drawings are for the purpose of illustrations only and are not intended as a definition of the limits of the invention:

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

First of all, a fundamental structure of a control system according to the present invention will be described in the following.

Figure 1:
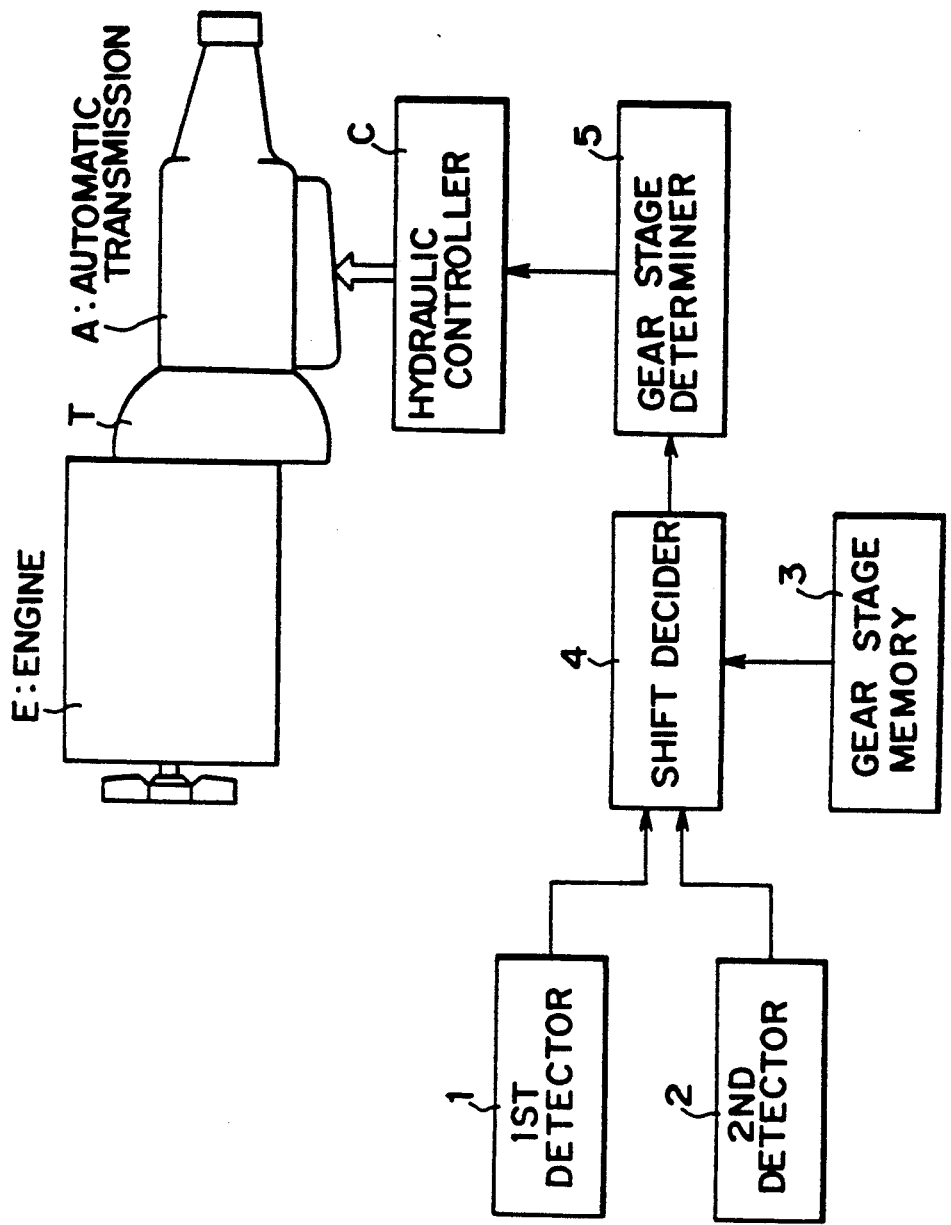
FIG. 1 is a block diagram showing the fundamental structure of a control system according to the present invention.

In FIG. 1, an automotive automatic transmission A is connected to an engine E through a fluid coupling T such as a torque converter so that it is set to a plurality of gear stages by applying engagement means suitably according to running conditions with an oil pressure fed from a hydraulic controller C. Since each gear stage is determined on the basis of at least two running conditions such as an engine load and a vehicle speed, the control system is equipped with a first detector 1 for detecting one of those conditions and outputting it as a first parameter, and a second detector 2 for detecting the other condition and outputting it as a second parameter. The control system is additionally equipped with a gear stage memory 3 which is stored with areas for holding the gear stages individually corresponding to the first parameter and the second parameter such that not always one but a plurality of gear stages correspond to a predetermined running condition determined by those two parameters. The control system is further equipped with a shift decider 4 which compares the parameters outputted from the aforementioned two detectors 1 and 2 with the stored content of the gear stage memory 3, to decide that a shift should be executed if the gear stage corresponding to the parameters obtained from the detectors 1 and 2 is different from the prevailing one. Since the gear stages correspond to the predetermined running condition, as has been described hereinbefore, the control system is further equipped with a gear stage determiner 5 for selecting any of the gear stages corresponding to the predetermined running condition.

In the system shown in FIG. 1, a vehicle speed or a corresponding running condition is detected as the first parameter and outputted by the first detector 1, and a throttle opening or a corresponding running condition is detected as the second parameter and outputted by the second detector 2. The shift decider 4 compares the signals inputted from those detectors 1 and 2 and the stored content of the gear stage memory 3 and decides whether or not it is the time to execute a shift. In this case, it may occur that there are a plurality of gear stages corresponding to the individual parameters outputted from the detectors 1 and 2. Then, the gear stage determiner 5 selects any of the gear stages on the basis of the changing rate of the throttle opening, the acceleration or deceleration of the vehicle, the gradient of the road or the rotational speed of the engine, or the signals computed from the foregoing data. In order to set the gear stage thus determined, the hydraulic controller C controls the oil to be fed to the automatic transmission A.

Figure 2:
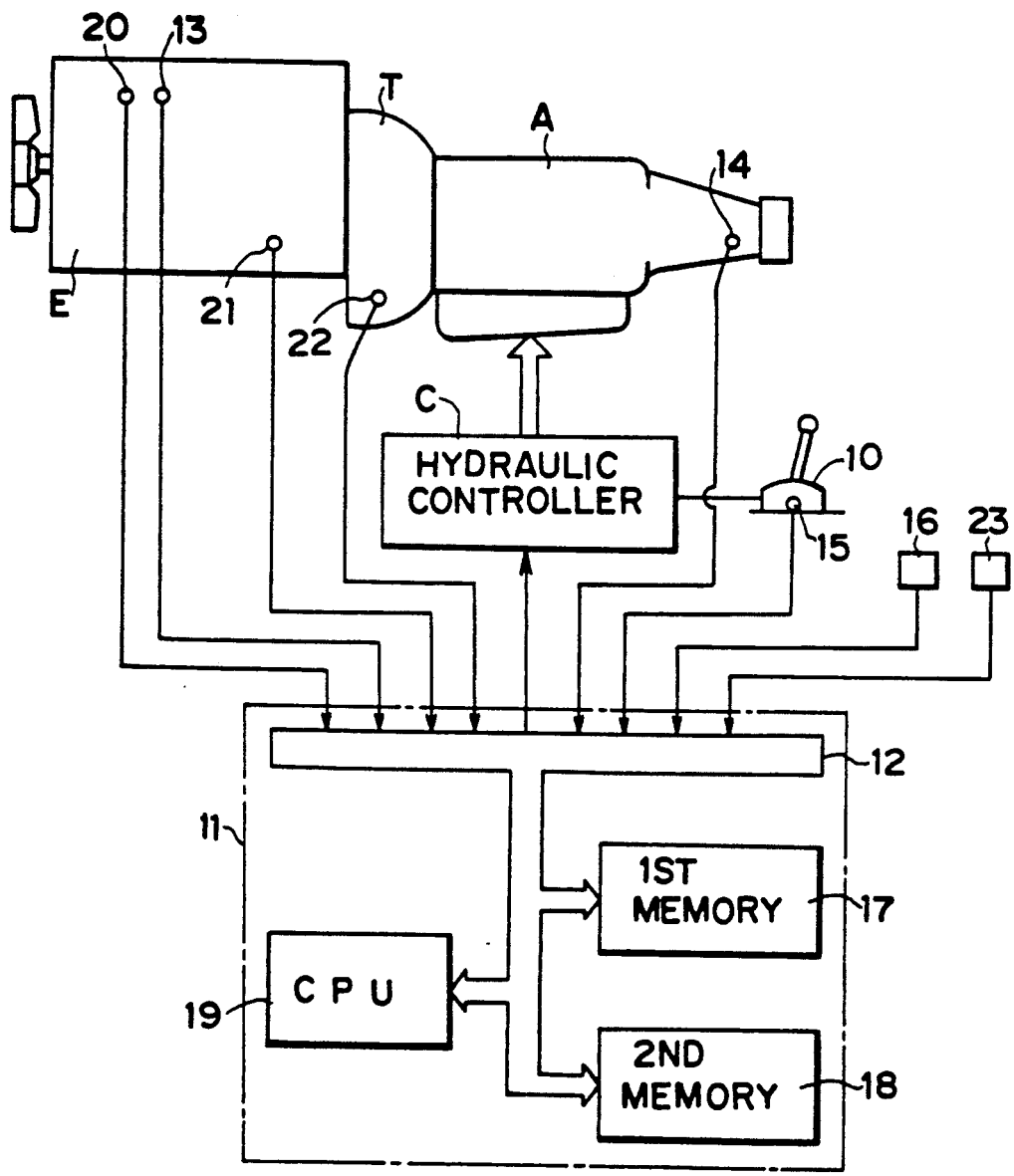
FIG. 2 is a block diagram showing an embodiment of the present invention.
Figure 3:
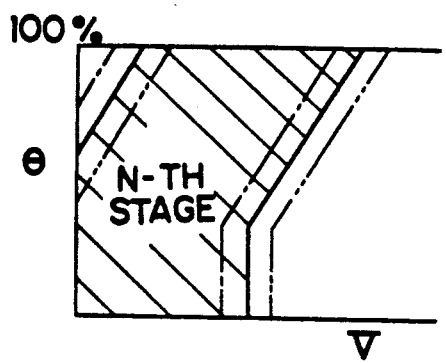
FIGS. 3 to 5 present examples of diagrams illustrating the speed stage areas of gear stages by using a vehicle speed and a throttle opening as parameters.
Figure 4:
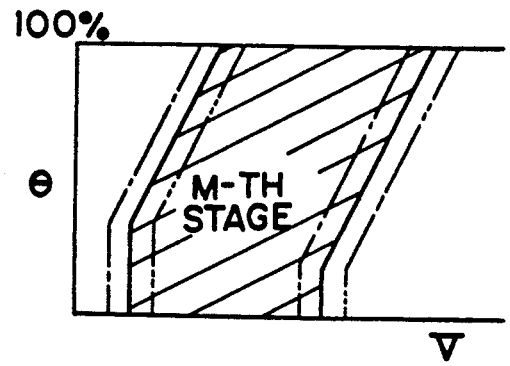
Figure 5:
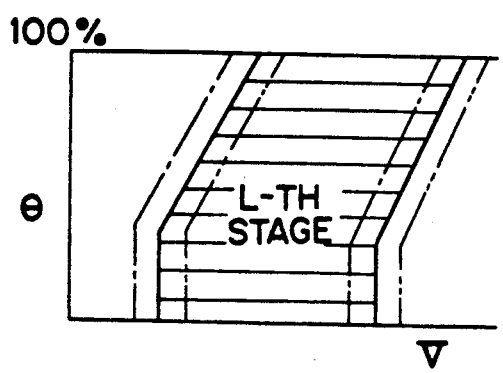
Figure 6:
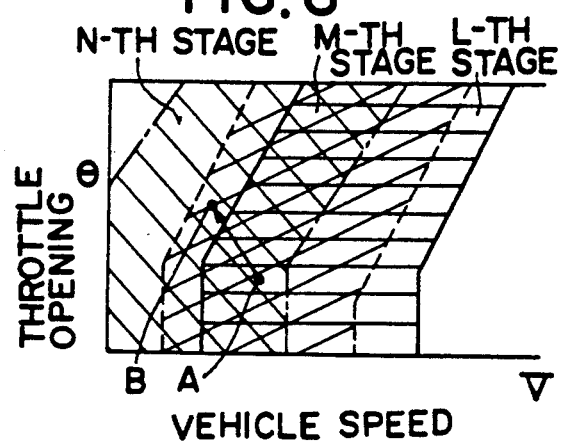
FIG. 6 is a shift map illustrating those speed stage areas altogether in a normal mode.

FIG. 2 is a block diagram showing the system of the present invention more specifically. The automatic transmission A, which is connected to the engine E through the fluid coupling T such as the torque converter, is equipped with gear trains which are adapted to set one of the gear stages in accordance with the combination of engagements/disengagements of a plurality of frictional engagement means. In order to set one of the gear stages, the control system is equipped with the hydraulic controller C for feeding the oil to or discharging it from the frictional engagement means. The hydraulic controller C to be used can be exemplified by those which are adopted in the prior automatic transmission, such as a hydraulic pump, a regulator value, a shift valve and a solenoid valve. To this hydraulic controller C, on the other hand, there is connected a shift lever 10 which is used to shift the manual valve (not-shown) of the hydraulic controller C to one of the individual parking (P), reverse (R), neutral (N), drive (D) and low (L) positions thereby to select a range. The control system is further equipped with an electronic control unit 11 for controlling the hydraulic controller C to set any of the gear stages. This electronic control unit 11 has its input/output unit 12 connected with: a throttle opening sensor 13 for detecting and outputting a degree of throttle opening $\theta$ of the engine E; a vehicle speed sensor 14 for detecting the rotational speed of the turbine or output shaft of the automatic transmission A and outputting it as a vehicle speed V; a shift position sensor 15 for detecting a position selected by the shift lever 10; and a select switch 16 for selecting one of shift patterns including normal, economy and power patterns.

On the other hand, the electronic control unit 11 comprises: a first memory 17 stored with data for determining the individual gear stages to be set by the automatic transmission A, as areas having certain extensions according to the throttle opening $\theta$ and the vehicle speed V; a second memory 18 stored with data for selecting one of the gear stages as corresponds to the vehicle speed V and throttle opening $\theta$ detected; and a central processing unit (CPU) 19. The stored contents of the first memory 17 are expressed in the diagrams (i.e., maps) having the vehicle speed V and the throttle opening $\theta$ as their parameters. The areas defined by the upshift lines and the downshift lines are used as the holding ones for the individual gear stages and are exemplified for predetermined three gear stages (e.g., l-th, m-th and n-th stages) in FIGS. 3 to 5. Moreover, the shift map plotting those areas in one diagram has its individual gear stage holding areas partially overlaid, as could be apparently seen from FIG. 6. In other words, the gear stages correspond to a predetermined state which is determined by the running condition of the vehicle speed V and the throttle opening $\theta$. Incidentally, the maps presented in FIGS. 3 to 6 are those for the normal pattern, and similar maps are also prepared for the power pattern and the economy pattern, which are selected by the select switch 16. Since the power pattern is used for the running mode stressing the power performance, it effects an upshift when the vehicle speed or the rotational speed of the engine rises to a relatively high level. Therefore, the speed stage areas for the individual n-th, m-th and l-th gear stages, for example, are shifted to the higher speed side, as indicated by double-dotted lines in FIGS. 3 to 5. On the other hand, the economy pattern stresses the mileage or fuel economy so that it effects an upshift at a relatively low vehicle speed or rotational speed. As a result, the individual gear stages are shifted to the lower speed side, as indicated by single-dotted lines in FIGS. 3 to 5.

Although not especially shown, moreover, the shift map is prepared for each shift position so that the position may be selected by the shift lever 10.

Figure 7:
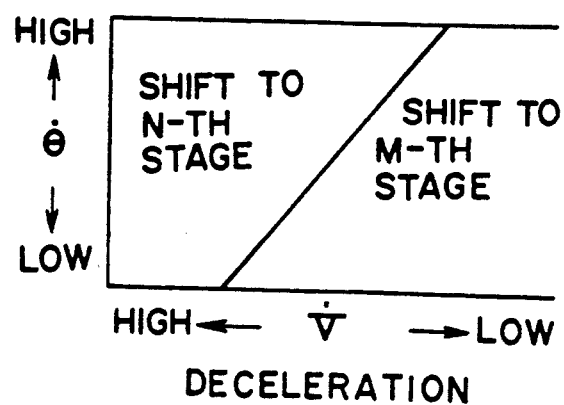
FIG. 7 is a map using a deceleration and a changing rate of the throttle opening as a third parameter for determining a gear stage.

The stored content of the second memory 18 is expressed by a diagram (or map) for determining any of the gear stages corresponding to the vehicle speed V and the throttle opening $\theta$, in dependence upon the acceleration or deceleration V and the changing rate $\theta$ of the throttle opening $\theta$, as is exemplified in FIG. 7. Here, the second memory 18 is also set with a diagram similar to that of FIG. 7 for each of the shift patterns to be selected by the select switch 16 and for each of the shift positions to be selected by the shift lever 10.

Incidentally, the electronic control unit 11 is connected with an air flow meter 20 for detecting the flow rate of intake air into the engine E, and sensors such as an engine rotational speed sensor 21, a turbine rotational speed sensor 22 for detecting the rotational speed of the turbine of the torque converter T and a slope sensor 23 for detecting the gradient of the road.

Figure 8:
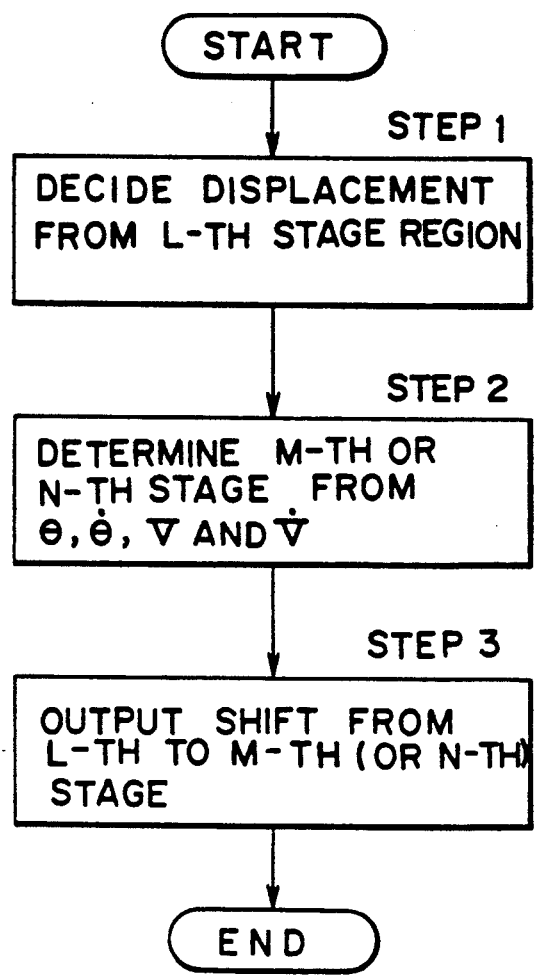
FIG. 8 is a flow chart showing a fundamental control routine of a control method according to the present invention.
Figure 10:
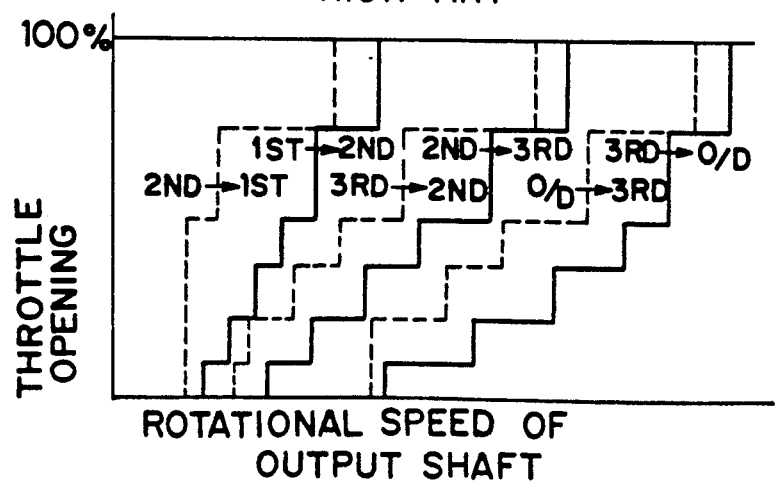
FIG. 10 presents an example of the shift diagram of the prior art.

The shift controls to be executed by the system thus far described are basically shown in FIG. 8. Here will be assumed the following state change: the running condition of the vehicle speed V and the throttle opening $\theta$ is changed from the state, in which the gear stage is at the l-th stage, as indicated at point A in FIG. 6, to the state, as indicated at point B, as the accelerator pedal is depressed with the reduction in the vehicle speed V. Then, it is decided (at Step 1) by the processing of the central processing unit 19 on the basis of the aforementioned two parameters and the stored content of the first memory 17 that the running condition has been displaced from the l-th stage area. Since the state of point B belongs to the m-th stage area and the n-th stage area, the electronic control unit computes and decides the changing rates V and $\theta$ of the vehicle speed V and the throttle opening $\theta$ to determine the m-th stage or n-th stage on the basis of the computed result and the stored content of the second memory 18 (at Step 2). If the deceleration V is high or if the accelerator pedal is abruptly depressed to increase the changing rate $\theta$ of the throttle opening $\theta$ highly, the lower n-th stage is selected. For the low deceleration V or the lower changing rate $\theta$ of the throttle opening $\theta$, on the contrary, the m-th stage higher than the n-th stage is selected. At Step 3, an output is made to execute the shift to the (m-th or n-th) stage thus selected. In short, the hydraulic controller C sets the selected gear stage by feeding or discharging the oil to engage or disengage the predetermined engagement means on the basis of the output coming from the electronic control unit 11.

Figure 9A:
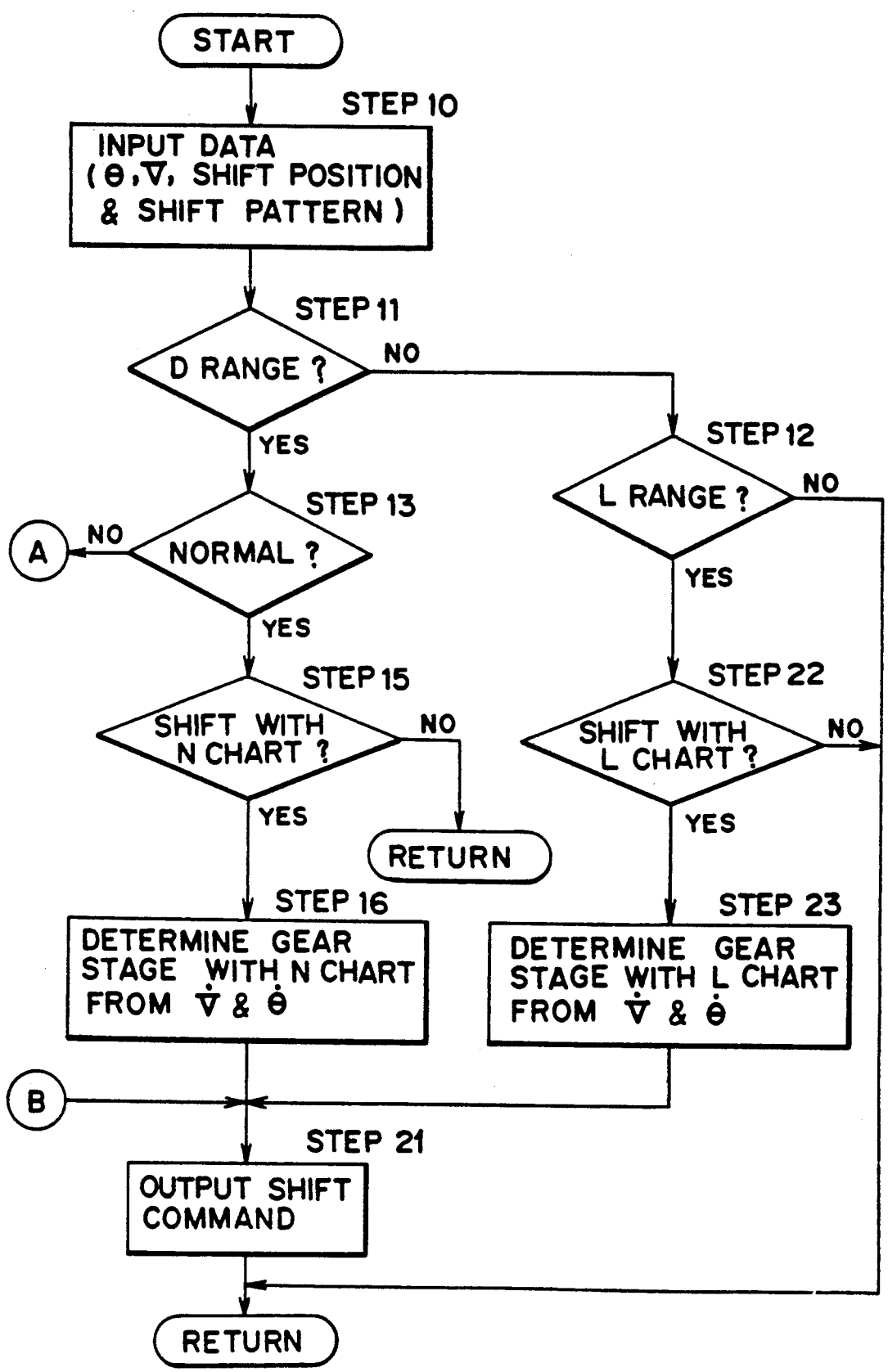
FIGS. 9A and 9B are flow charts showing a more specific control routine.
Figure 9B:
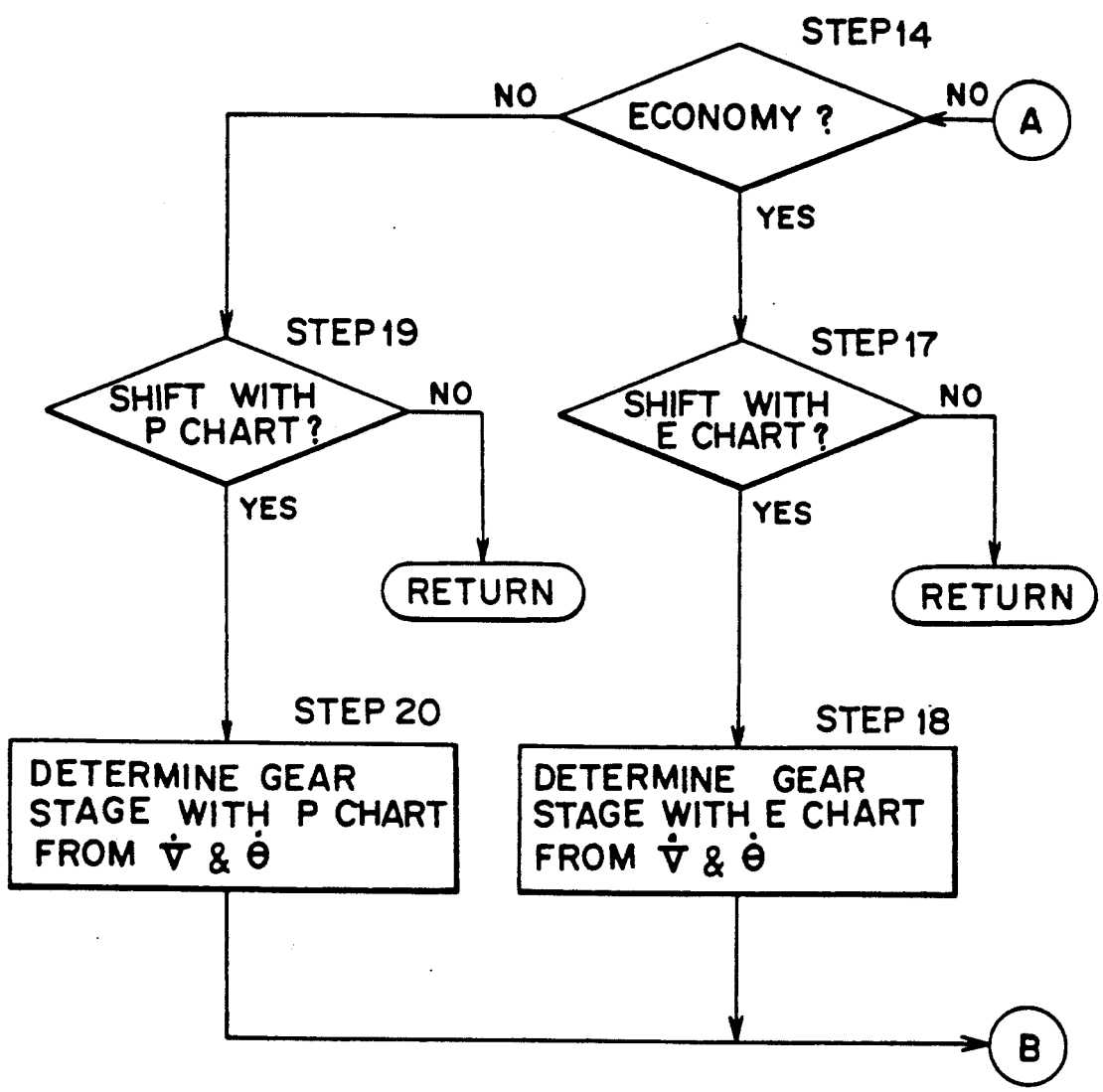

In the embodiment shown in FIG. 2, as has been described hereinbefore, it is possible to select the shift position by the shift lever 10 and the shift pattern by the select switch 16. The shift controls including these selections will be described with reference to the flow charts shown in FIGS. 9A and 9B. First of all, the various data including the vehicle speed V, the throttle opening $\theta$, the shift position, the shift pattern and the prevailing gear stage are inputted (at Step 10). This operation is executed by inputting the signals of the aforementioned individual sensors 13, 14 and 15 and the select switch 16 to the electronic control unit 11. It is then decided (at Step 11) whether or not the shift position is in the D range. If "NO", it is decided (at Step 12) whether or not the shift position is in the L range. If the decision result is "NO", this control routine is ended. If there is another forward range other than the L range in this case, its decision can also be executed. If the decision result of Step 11 is "YES", the shift pattern selected by the select switch 16 is decided. Specifically, it is decided at Step 13 whether or not the pattern is normal. If this decision result is "NO", it is decided (at Step 14) whether or not the pattern is economy. If the decision result at Step 13 is "YES", the necessity of shift is decided (at Step 15) on the basis of the map for the normal (N) pattern stored in the first memory 17. If this decision result is "NO", namely, if the vehicle speed V and the throttle opening $\theta$ are in the large area of the prevailing gear stage, the control process is returned. If the decision result is "YES", namely, if the detected vehicle speed V and throttle opening $\theta$ are out of the speed stage area of the prevailing gear stage, one predetermined gear stage is determined (at Step 16) from the speed stage area of the gear stage corresponding to the detected vehicle speed V and throttle opening $\theta$, on the basis of the normal pattern map of the deceleration V, the changing rate $\theta$ of the throttle opening $\theta$ and the stored content of the second memory 18.

If the decision result of Step 14 is "YES", the necessity for the gear stage is likewise decided (at Step 17) on the basis of the map for the economy (E) pattern. If the decision result is "YES", one predetermined gear stage is decided according to the map for the economy pattern. If the decision result of Step 14 is "NO", it is concluded that the power pattern is selected. Therefore, the decision of necessity for the shift (at Step 19) and the determination of the gear stage (at Step 20) are executed according to the map for the power (P) pattern.

A shift command is outputted (at Step 21) to execute the shift to the gear stage which has been determined at Step 16, 18 or 19.

If, on the other hand, the L range is selected so that the decision result of Step 12 is "YES", the necessity for shift is decided (at Step 22) according to the map for the L range in the first memory 17. If this decision result is "YES", the gear stage is determined (at Step 23) on the basis of the deceleration V, the changing rate $\theta$ of the throttle opening $\theta$ and the map for the L range, and a shift command for achieving that gear stage is outputted (at Step 21).

Incidentally, the foregoing embodiment uses two parameters, i.e., the vehicle speed V and the throttle opening $\theta$ for determining the speed stage areas of the gear stages. In short, it is sufficient in the present invention to determine the speed stage area of each gear stage in terms of at least two parameters, which should not be limited to the vehicle speed and the throttle opening. Moreover, the parameters for determining one of the gear stages, which can be selected for a predetermined running condition, are exemplified in the foregoing embodiment by the acceleration or deceleration V and the changing rate $\dot{\theta}$ of the throttle opening $\theta$. In the present invention, however, another parameter such as the gradient of the road or the rotational speed of the engine may be used to determine the gear stage. In this case, moreover, the optimum gear stage may be determined by using not the aforementioned diagram (or map) but the membership function in the fuzzy control.

As is now apparent from the description thus far made, the control system of the present invention can select gear stages for a predetermined running condition, and one gear stage is selected according to a third running condition such as the acceleration or deceleration or the changing rate of the throttle opening so that all the gear stages are not set. As a result, even the multistage automatic transmission can be prevented from coming into the so-called "busy shift". Moreover, the gear stage to be set is not one which is to be set merely by the skip shift but one according to the will of the driver or the running situations of the vehicle so that the optimum gear stage can be selected.

What is claimed is:

1. A control system of an automatic transmission for determining and setting a gear stage on the basis of at least two of parameters including a vehicle speed and a throttle opening of an engine, comprising:
   a first detector for detecting a first parameter;
   a second detector for detecting a second parameter;
   gear stage memory means for determining and storing speed stage areas for holding the gear stages individually in terms of the first and second parameters and in a partially overlaid manner such that said gear stage memory means determines and stores at least two gear stages for at least some values of said first and second parameters;
   shift decision means for determining a shift to be executed, on the basis of the first parameter outputted from the first detector, the second parameter outputted from the second detector, and the stored content of the gear stage memory means; and
   gear stage determining means for determining a gear stage to be set when there are a plurality of gear stages determined by the first parameter and second parameter detected and said stored content of the gear stage memory means on the basis of a third parameter.

2. A control system according to claim 1, wherein the gear stage memory means stores the speed stage areas as a shift map, which is determined by an upshift line determining shift points for an upshift in terms of the first parameter and the second parameter and separating the shift points and a downshift line determining shift points for a downshift in terms of the first parameter and the second parameter and separating the shift points.

3. A control system according to claim 2, further comprising a select switch for selecting a plurality of shift patterns,
   wherein the gear stage memory means has a plurality of shift maps according to the shift patterns.

4. A control system according to claim 1, wherein the first parameter is one of a vehicle speed and a rotational speed of a predetermined rotary member, which can be converted into the vehicle speed, whereas the second parameter is engine load.

5. A control system according to claim 4, wherein the engine load is detected in terms of one of a throttle opening and a flow rate of intake air per one rotation of the engine.

6. A control system according to claim 4, wherein the first detector includes one of a vehicle speed sensor and a rotational speed sensor.

7. A control system according to claim 5, wherein the second detector includes one of a throttle opening sensor, an engine rotational speed sensor and an air flow meter.

8. A control system according to claim 1, wherein the gear stage determining means determines one gear stage to be set, on the basis of any of the changing rate of the throttle opening, the changing rate of the vehicle speed, the gradient of the road and the engine rotational speed.

9. A control system according to claim 1, wherein the gear stage determining means has a map for determining one gear stage to be set, by using as its parameters any two of the changing rate of the throttle opening, the changing rate of the vehicle speed, the gradient of the road and the engine rotational speed.

10. A control system according to claim 1, wherein the gear stage determining means determines one gear stage to be set, by executing a fuzzy processing with the membership function on the basis of a plurality of input data.

11. A control method of an automatic transmission for determining and setting a gear stage on the basis of at least two of a plurality of parameters including a vehicle speed and a throttle opening of an engine, comprising the steps of:
    determining a plurality of speed stage areas for holding a plurality of gear stages individually, in terms of a first parameter and a second parameter and in a partially overlaid manner, wherein at least two gear stages are determined for at least some values of said first and second parameters;
    deciding a shift to be executed, on the basis of the first parameter outputted from a first detector, the second parameter outputted from a second detector and the speed stage areas stored in advance; and
    determining a gear stage to be set when there are a plurality of gear stages determined by the first parameter outputted from the first detector and the second parameter outputted from the second detector on the basis of a third parameter.

12. A control method according to claim 11, further comprising the step of storing the speed stage areas as a shift map, which is determined by an upshift line determining shift points for an upshift in terms of the first parameter and the second parameter and separating the shift points and a downshift line determining shift points for a downshift in terms of the first parameter and the second parameter and separating the shift points.

13. A control method according to claim 12, wherein a plurality of shift maps are stored in advance and are changed in accordance with a selection of a shift pattern to select the gear stage by using the changed shift map.

14. A control method according to claim 11, wherein the first parameter is one of a vehicle speed and a rotational speed of a predetermined rotary member, which can be converted into the vehicle speed, whereas the second parameter is engine load.

15. A control method according to claim 14, wherein the engine load is detected in terms of a throttle opening or a flow rate of intake air per one rotation of the engine.

16. A control method according to claim 11, wherein the third parameter includes any of the changing rate of the throttle opening, the changing rate of the vehicle speed, the gradient of the road and the engine rotational speed.

17. A control method according to claim 11, wherein one gear stage to be set is determined on the basis of the map which uses as its parameters any two of the changing rate of the throttle opening, the changing rate of the vehicle speed, the gradient of the road and the engine rotational speed.

18. A control method according to claim 11, wherein one gear stage to be set is determined by executing a fuzzy processing with the membership function on the basis of a plurality of input data.

* * * * *